US011213854B2

(12) United States Patent
Ono et al.

(10) Patent No.: US 11,213,854 B2
(45) Date of Patent: Jan. 4, 2022

(54) METHOD OF FORMING MULTILAYER COATING FILM

(71) Applicants: KANSAI PAINT CO., LTD., Hyogo (JP); TOYOTA JIDOSHA KABUSHIKI KAISHA, Toyota (JP)

(72) Inventors: Keita Ono, Miyoshi (JP); Masahiro Omura, Miyoshi (JP); Masayoshi Asai, Nagoya (JP); Tetsuya Nishiguchi, Nisshin (JP)

(73) Assignees: KANSAI PAINT CO., LTD., Hyogo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 390 days.

(21) Appl. No.: 16/409,145

(22) Filed: May 10, 2019

(65) Prior Publication Data

US 2019/0344309 A1 Nov. 14, 2019

(30) Foreign Application Priority Data

May 11, 2018 (JP) ............................ JP2018-092110

(51) Int. Cl.

*B05D 7/00* (2006.01)
*B05D 3/02* (2006.01)
*C08K 3/013* (2018.01)
*C09D 133/08* (2006.01)
*C09D 161/28* (2006.01)

(52) U.S. Cl.

CPC ............... *B05D 7/532* (2013.01); *B05D 3/02* (2013.01); *C08K 3/013* (2018.01); *C09D 133/08* (2013.01); *C09D 161/28* (2013.01); *B05D 2502/00* (2013.01); *B05D 2508/00* (2013.01); *B05D 2518/00* (2013.01); *B05D 2601/02* (2013.01); *C08K 2201/019* (2013.01)

(58) Field of Classification Search

None

See application file for complete search history.

(56) References Cited

U.S. PATENT DOCUMENTS

| | | | |
|---|---|---|---|
| 8,496,996 | B2 | 7/2013 | Tonomura et al. |
| 2007/0104874 | A1 | 5/2007 | Ogawa et al. |

FOREIGN PATENT DOCUMENTS

| | | | | |
|---|---|---|---|---|
| JP | 10156279 | A | * | 6/1998 |
| JP | 2004351389 | A | | 12/2004 |
| JP | 2004351390 | A | | 12/2004 |
| JP | 2007023064 | A | * | 2/2007 |
| JP | 2007106925 | A | * | 4/2007 |
| JP | 2008543532 | A | | 12/2008 |
| WO | 2004105965 | A1 | | 12/2004 |
| WO | 06132437 | A3 | | 2/2007 |

OTHER PUBLICATIONS

English Abstract of JP-2004351390, Publication Date: Dec. 16, 2004.

* cited by examiner

*Primary Examiner* — William P Fletcher, III

(74) *Attorney, Agent, or Firm* — Millen White Zelano and Branigan, PC; John Sopp

(57) ABSTRACT

A method of forming a multilayer coating film with excellent flip-flop properties and smoothness and allowing formation of a high-design multilayer coating film. In a method of forming a multilayer coating film comprising: a low-brightness intercoating film; a first base coating film; a second base coating film formed on an object to be coated; and a clear coating film formed on the second base coating film; the first base coating film is obtained by applying a first aqueous base coating material, the second base coating film is obtained by applying a second aqueous base coating material containing a brightness pigment, the clear coating film, with specific compositions and properties, is formed on a low-brightness intercoating film by a wet-on-wet method and the multilayer coating film is heat cured to form a cured multilayer coating film.

2 Claims, No Drawings

METHOD OF FORMING MULTILAYER COATING FILM

FIELD

The present invention relates to a method of forming a multilayer coating film, and particularly it relates to a method of forming a multilayer coating film that allows formation of a multilayer coating film with excellent brightness and a high design property.

BACKGROUND

It is generally desirable for a coating film, which is formed by applying a coating material onto an object to be coated, to be able to protect the object to be coated while providing it with an outer design property (aesthetic quality). Top coat materials that are to be coated onto automobile outer platings, in particular, must be able to form top coating films with high texture and design properties.

Coating of an automobile body is usually carried out by forming an electrodeposition coating, an intercoating film and a top coating film in that order on an object to be coated. Commonly, in prior art methods, electrodeposition is carried out by immersion of the object to be coated in an electrodeposition coating material, and then the coating material is cured by baking treatment at high temperature to form an electrodeposition coating, after which an intercoat material is applied onto the electrodeposition coating and then subjected to baking treatment to form an intercoating film, and a top coat material is subsequently coated onto the intercoating film and subjected to baking treatment to form a top coating film.

For example, multilayer coating films with metallic coatings or mica coatings, which have become mainstream in recent years as top coating films with high-level designs, are formed in a manner in which the top coat materials used are base coating materials containing brightness pigments for obtaining high brightness, and transparent clear coating materials. High-brilliance coating films generally have notable variation in brightness depending on the observation angle, when the coating films are observed at different angles, and the brightness pigments are relatively homogeneously present in the coating films, with virtually no observable metallic streaks. Moreover, when the observation angle-dependent brightness variation is high as mentioned above, the flip-flop property usually tends to be high.

As brightness pigments, aluminum flake pigments with metallic gloss are generally used for metallic paint colors, while mica with coherence is generally used for mica paint colors. In most cases, a multilayer coating film having a paint color of such a type is formed by using a wet-on-wet method to apply a brightness pigment-containing base coating material and a clear coating material in that order onto a baked intercoating film, and then curing the obtained uncured coating film by a single baking treatment.

However, when a multilayer coating film of a metallic paint color or mica paint color is formed by wet-on-wet coating, one problem that has been faced has been reduced brightness caused by disturbance in the orientation of the brightness pigment in the base coating material.

The use of aqueous coating materials has been increasing in recent years from the viewpoint of reducing environmental load, but because of the slow volatilization rate of water, which is the diluting solvent used in aqueous coating materials, as well as the fact that the volatilization rate is significantly affected by the environmental conditions during coating such as the temperature and humidity, the use of wet-on-wet coating with aqueous coating materials tends to be associated with more disturbance to the orientation of the brightness pigment than when using organic solvent-based coating materials, and as a result, the reduction in brightness is more notable.

Numerous methods have been proposed in the prior art to solve this problem.

For example, PTL 1 and PTL 2 each disclose a method of forming a brilliant coating film, including a step of coating an aqueous first base brilliant coating material onto an intercoating film to form an uncured first base coating film, coating an aqueous second base brilliant coating material onto the uncured first base coating film to form an uncured second base coating film, coating a clear coating material onto the uncured second base coating film to form a clear coating film, and heat curing the uncured first base coating film, second base coating film and clear coating film all at once. In these published documents it is stated that by adjusting the solid content of the coating material and the brightness pigment concentration in the aqueous first base brilliant coating material and the aqueous second base brilliant coating material used in the methods, it is possible to obtain a brilliant coating film that has a metallic outer appearance without uneven brightness when using an aluminum flake pigment that has metallic gloss, while exhibiting a very high flip-flop property when using a mica pigment that has coherence.

However, with the brilliant coating film-forming methods described in PTL 1 and PTL 2, the finishing of inner plating coating films is affected by spray dust of the outer plating base coating materials, resulting in an inconvenience in that the sheen quality of the inner plating coating films can be lost depending on the type of brightening material and coating color, especially for coating of automobile bodies.

Moreover, in the field of automobile coatings in particular, since marketability is significantly affected by the texture and design property provided by the formed coating film, it is essential to continue to develop coating film-forming methods that allow formation of high-design multilayer coating films with excellent flip-flop properties and smoothness.

CITATION LIST

Patent Literature

[PTL 1] Japanese Unexamined Patent Publication No. 2004-351389

[PTL 2] Japanese Unexamined Patent Publication No. 2004-351390

SUMMARY

Technical Problem

The present invention is designed to provide a method of forming a multilayer coating film that can deal with the aforementioned problems of the prior art while forming a high-design multilayer coating film with excellent flip-flop properties and smoothness.

Solution to Problem

The present inventors have devised this invention upon finding that the aforementioned problems can be solved by employing a method of forming a multilayer coating film in which an uncured first base coating film, a second base coating film and a clear coating film are formed in that order on a low-brightness intercoating film that has been formed on a coating article, and then subjected to a baking step, while employing coating materials with specific compositions and properties as the first aqueous base coating material and second aqueous base coating material used to form the first base coating film and second base coating film, and adjusting the brightness of the low-brightness intercoating film that is formed.

Specifically, the present invention is a method of forming a multilayer coating film comprising a low-brightness intercoating film formed on an object to be coated, a first base coating film formed on the low-brightness intercoating film, a second base coating film formed on the first base coating film and a clear coating film formed on the second base coating film, the method including:

(1) a first base coating film-forming step in which a thermosetting first aqueous base coating material is coated onto the low-brightness intercoating film to form an uncured first base coating film;

(2) a second base coating film-forming step in which a thermosetting second aqueous base coating material containing a brightness pigment is coated onto the uncured first base coating film to form an uncured second base coating film;

(3) a preheating step in which the uncured first base coating film and second base coating film are preheated;

(4) a clear coating film-forming step in which a thermosetting clear coating material is coated onto the preheated second base coating film to form an uncured clear coating film; and (5) a baking step in which the multilayer coating film comprising the preheated first base coating film and second base coating film and the uncured clear coating film is subjected to heat curing to form a cured multilayer coating film, wherein:

(a) the L* value of the low-brightness intercoating film is 30 or smaller, (b) the first aqueous base coating material has a coating material solid concentration in the range of 16 to 45 mass %, and contains a water-dispersible hydroxyl group-containing acrylic resin (a) and a melamine resin (b), the water-dispersible hydroxyl group-containing acrylic resin (a) having a core/shell-type multilayer structure composed of a core of a copolymer (I) obtained by copolymerizing 0.1 to 30 mass % of a polymerizable unsaturated monomer with two or more polymerizable unsaturated groups in the molecule (a1) and 70 to 99.9 mass % of another polymerizable unsaturated monomer (a2), and a shell of a copolymer (II) obtained by copolymerizing 5 to 50 mass % of a vinyl aromatic compound (a3) and 50 to 95 mass % of another polymerizable unsaturated monomer (a4), and the copolymer (I)/copolymer (II) solid mass ratio being in the range of 10/90 to 90/10, and the weight-average molecular weight of the melamine resin (b) being in the range of 1,000 to 3,000, (c) the viscosity of the first aqueous base coating material at 90 seconds after coating is in the range of 15,000 to 300,000 mPa·s as measured under conditions with a temperature of 25° C. and a shear rate of 0.1 $sec^{-1}$, (d) the black-white concealing film thickness of the cured coating film of the first aqueous base coating material is 50 μm or greater, and the haze of the cured coating film with a film thickness of 15 μm is in the range of 0 to 15%, (e) the second aqueous base coating material has a coating material solid concentration in the range of 5 to 15 mass % and contains a brightness pigment in the range of 10 to 40 parts by mass with respect to 100 parts by mass as the solid content of the second aqueous base coating material, (f) the film thickness of the cured second base coating film is in the range of 2 to 8 μm, and (g) the ratio between the film thicknesses of the cured first base coating film and second base coating film is in the range of 1.5:1 to 6:1.

Advantageous Effects of Invention

According to the invention it is possible to form a high-design multilayer coating film with excellent flip-flop properties and smoothness, by a multilayer coating film structure comprising a low-brightness intercoating film with a specific brightness as the intercoat material, and having a specific first base coating film and second base coating film formed over it. Furthermore, since the multilayer coating film structure is formed by wet-on-wet coating using aqueous coating materials, it is possible to obtain an excellent environmental load-reducing effect and energy efficiency effect. In addition, when the present invention is applied for automobile coating, the effect of spray dust of the outer plating base coating material on finishing of the inner plating coating film can be drastically reduced.

DESCRIPTION OF EMBODIMENTS

In the method of the invention, a first base coating film, second base coating film and clear coating film are formed in that order on a low-brightness intercoating film formed on an object to be coated, to produce a multilayer coating film.

[Object to be Coated]

There are no particular restrictions on the object to be coated for the invention, and as examples there may be mentioned external platings of automobile bodies of passenger vehicles, trucks, motorcycles and buses; automobile parts; and external platings of consumer electric products such as cellular phones or audio devices. Preferred among these are external platings of automobile bodies, and automobile parts.

The materials for the object to be coated are not particularly restricted, and examples include metal materials such as iron, aluminum, brass, copper, stainless steel, tin, galvanized steel and alloyed zinc (such as Zn—Al, Zn—Ni and Zn—Fe)-plated steel and the like; resins such as polyethylene resins, polypropylene resins, acrylonitrile-butadiene-styrene (ABS) resins, polyamide resins, acrylic resins, vinylidene chloride resins, polycarbonate resins, polyurethane resins and epoxy resins, plastic materials such as various FRP materials; inorganic materials such as glass, cement and concrete; wood materials; and fiber materials (such as paper and fabrics). Preferred among these are metal materials and plastic materials.

The object to be coated may be an article that is a metal material or has a metal surface such as that of a car body that has been formed from it, that has been surface-treated by phosphate treatment, chromate treatment or complex oxide treatment, or that further has a coating film formed over it.

Objects to be coated having coating films formed include base materials that have been surface-treated as necessary, with undercoat films formed thereover. Of these, car bodies having undercoat films formed by electrodeposition coating are preferred, and car bodies having undercoat films formed by cationic electrodeposition coating are more preferred.

[Low-Brightness Intercoating Film]

The intercoating film is formed to conceal the material surface or undercoat film or to impart adhesion or chipping resistance, and it can be obtained by applying an intercoat material containing a base resin and curing agent onto the material surface or undercoat film, and drying and curing it. According to the invention, a low-brightness intercoating film having an L* value of 30 or smaller is used as the intercoating film. The low-brightness intercoating film may be formed by coating the object to be coated with a low-brightness intercoat material comprising a black pigment or the like mixed with an intercoat material. Throughout the present specification, the L* value of the low-brightness intercoating film refers to the L* value for the heat cured low-brightness intercoating film.

The base resin and curing agent used in the intercoat material may be compounds that are suitable for use in intercoat materials. Examples of such base resins include acrylic resins, polyester resins, alkyd resins and urethane resins with crosslinkable functional groups such as hydroxyl groups. Curing agents include amino resins such as melamine resins and urea resins, and polyisocyanate compounds (also including block bodies), which may be used as solutions or dispersions in a solvent such as an organic solvent and/or water.

Black pigments that may be added to the intercoat material include various black pigments for coating materials, which may be either organic pigments or inorganic pigments. Examples of such black pigments include carbon black, acetylene black, lamp black, bone black, graphite, black iron oxide (tetrairon trioxide), black titanium oxide, copper-manganese black, copper-chromium black, cobalt black, cyanine black and aniline black, any of which may be used alone or in combinations of two or more.

When the intercoat material contains a black pigment, the content of the black pigment is suitably in the range of 0.7 to 4 parts by mass, preferably 1 to 3.5 parts by mass and more preferably 1.3 to 2.5 parts by mass, based on 100 parts by mass as the total solid content of the base resin and curing agent.

For the purpose of the invention, the intercoat material may also contain a pigment other than a black pigment. Examples of pigments other than the aforementioned black pigments include any color pigments other than black pigments, such as white pigments, extender pigments and brightness pigments, any of which may be used alone or in combinations of two or more.

Compounds of color pigments other than black pigments include titanium oxide, zinc oxide, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments and diketopyrrolopyrrole-based pigments, among which titanium oxide is most suitable for use.

Examples of extender pigments include barium sulfate, talc, clay, kaolin, barium carbonate, calcium carbonate, silica and alumina white. Most suitable for use among these are barium sulfate and/or talc, and preferably barium sulfate.

Examples of brightness pigments include aluminum (including vapor deposited aluminum), copper, zinc, brass, nickel, glass flakes, aluminum oxide, mica, aluminum oxide covered by titanium oxide and/or iron oxide and mica covered by titanium oxide and/or iron oxide, among which aluminum pigments are most suitable for use.

According to the invention, the low-brightness intercoat material may appropriately contain, if necessary, a solvent such as water or an organic solvent, various additives such as a pigment dispersant, curing catalyst, antifoaming agent, antioxidant, ultraviolet absorber, light stabilizer or surface control agent, or a gloss adjusting agent. The low-brightness intercoat material of the invention may be either an organic solvent-based coating material or an aqueous coating material.

The low-brightness intercoat material may be applied by a publicly known method such as rotary atomizing coating, air spraying or airless spraying, after adding water or an organic solvent for adjustment to a viscosity suitable for application.

The intercoating film that is formed may be a coating film cured by baking treatment. The baking treatment temperature will usually be 80 to 180° C., and it is most preferably in the range of 120 to 160° C. The baking treatment time is preferably 10 to 60 minutes.

The intercoating film that has been formed may also be provided for coating by the first aqueous base coating material described below, while it is in an uncured state without being baked. In this case, the first aqueous base coating material may be coated after subjecting the intercoating film to preheating as described below. The uncured intercoating film may also be heat cured in a step of heat curing the multilayer coating film comprising the preheated first base coating film and second base coating film, and the uncured clear coating film.

The film thickness of the low-brightness intercoating film of the invention will generally be in the range of 10 to 50 μm, and most preferably 15 to 40 μm, as the cured film thickness.

The low-brightness intercoating film that is used for the invention has an L* value of 30 or smaller, as the brightness according to the L*a*b* color system. The L*a*b* color system is the color system standardized by the Commission Internationale de l'Eclairage (CIE) in 1976, and also employed in Japan as JIS Z 8784-1, and it expresses brightness as L*, and chromaticity (color hue and chroma) as a* and b*. The value of a represents the red direction (−a* being the green direction), and b* represents the yellow direction (−b* being the blue direction). The value of L*, as used herein, is defined as the numerical value calculated from the spectral reflectance received at 90° with respect to the coating film surface, using a multi-angle spectrophotometer CM512m3 (trade name of Konica Minolta Holdings, Inc.), with light irradiation at 45° with respect to the axis perpendicular to the coating film surface.

The L* value of the low-brightness intercoating film can be appropriately modified by adjusting the contents and mixing proportions of the pigments such as the black pigment, white pigment and other color pigments and extender pigments added to the intercoat material.

By using a low-brightness intercoating film with this level of brightness, it combines with the first base coating film and second base coating film formed using the first aqueous base coating material and second aqueous base coating material having the specified composition and properties, to form a brilliant coating film with excellent flip-flop properties. The L* value of the low-brightness intercoating film is more preferably in the range of 5 to 30 and even more preferably in the range of 15 to 25.

[First Base Coating Film-Forming Step]

In the first base coating film-forming step, the thermosetting first aqueous base coating material is applied onto the low-brightness intercoating film to form an uncured first base coating film. The thermosetting first aqueous base coating material is prepared by mixing the coating film-forming base resin and curing agent with any of various additives that may be added as necessary to coating materials, such as viscosity-imparting agents, flow adjusters, light stabilizers, ultraviolet absorbers, color pigments, extender pigments and pigment dispersants. Preferably, the first aqueous base coating material does not contain a brightness pigment.

The thermosetting first aqueous base coating material used for the invention contains a specific water-dispersible hydroxyl group-containing acrylic resin (a) and melamine resin (b), described below, as the base resin and curing agent. By using the specific base resin and curing agent, it is possible to increase the baked/dried transparency of the first base coating film and to combine it with the low-brightness intercoating film and brightness-exhibiting second base coating film above and below the first base coating film, to form a multilayer coating film having excellent flip-flop properties. In addition, when applied for automobile coating, the effect of spray dust of the outer plating base coating material on finishing of the inner plating coating film can be drastically reduced.

The water-dispersible hydroxyl group-containing acrylic resin (a) and melamine resin (b) to be used in the thermosetting first aqueous base coating material of the invention will now be explained.

The water-dispersible hydroxyl group-containing acrylic resin (a) to be used as a base resin for the thermosetting first aqueous base coating material of the invention is a water-dispersible hydroxyl group-containing acrylic resin having a core/shell-type multilayer structure composed of:

a core of a copolymer (I) obtained by copolymerizing 0.1 to 30 mass % of a polymerizable unsaturated monomer with two or more polymerizable unsaturated groups in the molecule (a1) and 70 to 99.9 mass % of another polymerizable unsaturated monomer (a2), and a shell of a copolymer (II) obtained by copolymerizing 5 to 50 mass % of a vinyl aromatic compound (a3) and 50 to 95 mass % of another polymerizable unsaturated monomer (a4), the solid mass ratio of copolymer (I)/copolymer (II) being in the range of 10/90 to 90/10.

Examples for the polymerizable unsaturated monomer with two or more polymerizable unsaturated groups in the molecule (a1), to be used as a monomer for the core section copolymer (I), include allyl(meth)acrylate, ethyleneglycol di(meth)acrylate, triethyleneglycol di(meth)acrylate, tetraethyleneglycol di(meth)acrylate, 1,3-butyleneglycol di(meth)acrylate, trimethylolpropane tri(meth)acrylate, 1,4-butanediol di(meth)acrylate, neopentyl glycol di(meth) acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth) acrylate, 1,1,1-trishydroxymethylpropane tri(meth)acrylate, triallyl isocyanurate, diallyl terephthalate and divinylbenzene. These monomers may be used alone or in combinations of two or more.

The polymerizable unsaturated monomer with two or more polymerizable unsaturated groups in the molecule (a1) has the function of imparting a crosslinked structure to the core section copolymer (I). The proportion of the polymerizable unsaturated monomer with two or more polymerizable unsaturated groups in the molecule (a1) that is used may be appropriately determined according to the degree of crosslinking of the core section copolymer (I), but for most purposes it is preferably about 0.1 to 30 mass %, more preferably about 0.5 to 10 mass % and even more preferably about 1 to 7 mass %, based on the total amount of the polymerizable unsaturated monomer with two or more polymerizable unsaturated groups in the molecule and the polymerizable unsaturated monomer with one polymerizable unsaturated group in the molecule.

The polymerizable unsaturated monomer with two or more polymerizable unsaturated groups in the molecule is preferably an amide group-containing monomer such as methylene bis(meth)acrylamide or ethylene bis(meth)acrylamide, from the viewpoint of minimizing uneven brightness of the coating film that is to be obtained. When an amide group-containing monomer is to be used, it is used in an amount of preferably about 0.1 to 25 mass %, more preferably about 0.5 to 8 mass % and even more preferably about 1 to 4 mass %, based on the total amount of the polymerizable unsaturated monomer with two or more polymerizable unsaturated groups in the molecule and the polymerizable unsaturated monomer with one polymerizable unsaturated group in the molecule.

The other polymerizable unsaturated monomer (a2) to be used as a monomer for the core section copolymer (I) is a monomer having a polymerizable unsaturated group that is copolymerizable with the polymerizable unsaturated monomer with two or more polymerizable unsaturated groups in the molecule, and it includes compounds with one polymerizable unsaturated group such as vinyl or (meth)acryloyl in the molecule.

Specific examples for the other polymerizable unsaturated monomer (a2) include alkyl or cycloalkyl (meth)acrylates such as methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl acrylate (trade name of Osaka Organic Chemical Industry, Ltd.), cyclohexyl (meth)acrylate, methylcyclohexyl (meth) acrylate, t-butylcyclohexyl (meth)acrylate and cyclododecyl (meth)acrylate; polymerizable unsaturated monomers with isobornyl groups such as isobornyl (meth)acrylate; polymerizable unsaturated monomers with adamantyl groups such as adamantyl (meth)acrylate; vinyl aromatic compounds such as styrene, α-methylstyrene and vinyltoluene; polymerizable unsaturated monomers with alkoxysilyl groups such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; perfluoroalkyl (meth)acrylates such as perfluorobutylethyl (meth)acrylate and perfluorooctylethyl (meth)acrylate; polymerizable unsaturated monomers with fluorinated alkyl groups such as fluoroolefins; monomers with photopolymerizable functional groups such as maleimide; vinyl compounds such as N-vinylpyrrolidone, ethylene, butadiene, chloroprene, vinyl propionate and vinyl acetate; carboxyl group-containing polymerizable unsaturated monomers such as (meth)acrylic acid, maleic acid, crotonic acid and β-carboxyethyl acrylate; nitrogen-containing polymerizable unsaturated monomers such as (meta) acrylonitrile, (meth)acrylamide, N,N-dimethylaminoethyl (meth)acrylate, N,N-dimethylaminopropyl (meth)acrylamide and addition products of glycidyl (meth)acrylate and amines; hydroxyl-containing polymerizable unsaturated monomers such as monoesters of (meth)acrylic acid and dihydric alcohols of 2 to 8 carbon atoms, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified forms of monoesters of (meth) acrylic acid and 2 to 8 carbon atoms dihydric alcohols, N-hydroxymethyl (meth)acrylamide, allyl alcohols, and (meth)acrylates having polyoxyethylene chains with hydroxyl groups at the molecular ends; epoxy group-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allyl glycidyl ether; (meth)acrylates having polyoxyethylene chains with alkoxy groups at the molecular ends; sulfonic acid group-containing polymerizable unsaturated monomers such as 2-acrylamide-2-methylpropanesulfonate, allylsulfonic acid, sodium styrenesulfonate, sulfoethyl methacrylate and its sodium salts or ammonium salts; phosphate group-containing polymerizable unsaturated monomers such as 2-acryloyloxyethyl acid phosphate, 2-methacryloyloxyethyl acid phosphate, 2-acryloyloxypropyl acid phosphate and 2-methacryloyloxypropyl acid phosphate; monomers with ultraviolet absorbing functional groups such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone and 2-(2'-hydroxy-5'-methacryloyloxyethylphenyl)-2H-benzotriazole; monomers with ultraviolet stability such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonylamino-2,2,6,6-tetramethylpiperidine and 1-crotonoyl-4-crotonoyloxy-2,2,6,6-tetramethylpiperidine; carbonyl group-containing monomer compounds such as acrolein, diacetoneacrylamide, diacetonemethacrylamide, acetoacetoxyethyl methacrylate, formylstyrol, and vinylalkyl ketones with 4 to 7 carbon atoms (such as vinylmethyl ketone, vinylethyl ketone and vinylbutyl ketone), as well as combinations of the foregoing.

When producing copolymer (I), the polymerizable unsaturated monomer (a1) may be in the range of preferably 0.1 to 20 mass %, more preferably 0.2 to 10 mass % and even more preferably 0.7 to 4 mass %, based on the total mass of the polymerizable unsaturated monomer (a1) and the polymerizable unsaturated monomer (a2), and the polymerizable unsaturated monomer (a2) may be in the range of preferably 80 to 99.9 mass %, more preferably 90 to 99.8 mass % and even more preferably 96 to 99.3 mass %, based on the total mass of the polymerizable unsaturated monomer (a1) and the polymerizable unsaturated monomer (a2), from the viewpoint of production stability and of the water resistance and weather resistance of the coating film that is to be obtained.

The shell section copolymer (II) may be obtained by copolymerizing 5 to 50 mass % of the vinyl aromatic compound (a3) and 50 to 95 mass % of the other polymerizable unsaturated monomer (a4). If the proportion of the vinyl aromatic compound (a3) in the shell section copolymer (II) is 5 to 50 mass %, it will be possible to form a coating film with excellent flip-flop properties. The proportion of the vinyl aromatic compound (a3) is preferably in the range of 6 to 45 mass % and more preferably in the range of 8 to 40 mass %.

Specific examples for the vinyl aromatic compound (a3) to be used as a monomer for the shell section copolymer (II) include vinylbenzenes such as styrene, α-methylstyrene, p-methylstyrene, p-tert-butylstyrene and divinylbenzene, among which styrene is most suitable for use.

The other polymerizable unsaturated monomer (a4) to be used as a monomer for the shell section copolymer (II) may be a monomer appropriately selected from among the monomers mentioned for the other polymerizable unsaturated monomer (a2), other than the vinyl aromatic compound (a3), but from the viewpoint of ensuring stability of the obtained emulsion resin in the aqueous medium, at least a portion of the component preferably includes a hydroxyl-containing unsaturated monomer, for increased stability of the emulsion resin in the aqueous medium. Most preferred as hydroxyl-containing unsaturated monomers are 2-hydroxyethyl (meth)acrylate, 2-hydroxypropyl (meth)acrylate, 3-hydroxypropyl (meth)acrylate and 4-hydroxybutyl (meth)acrylate. From the viewpoint of stability of the emulsion resin in the aqueous medium and the water resistance of the coating film that is to be obtained, the amount of the hydroxyl-containing monomer will usually be in the range of 1 to 40 mass %, preferably 3 to 25 mass % and more preferably 4 to 20 mass %, based on the total mass of the vinyl aromatic compound (a3) and the other polymerizable unsaturated monomer (a4), for increased storage stability and water resistance of the coating film that is to be obtained.

A core-shell emulsion can be obtained, for example, by emulsion polymerization of a monomer mixture (1) containing the polymerizable unsaturated monomer (a1) and polymerizable unsaturated monomer (a2) in the proportion specified above, to produce copolymer (I), and then adding a monomer mixture (2) containing the vinyl aromatic compound (a3) and the other polymerizable unsaturated monomer (a4), and conducting further emulsion polymerization. The emulsion polymerization for monomer mixture (1) may be carried out by a known method, such as a method using a polymerization initiator in the presence of an emulsifying agent. The monomer mixture (2) may also include components such as a polymerization initiator, chain transfer agent, reducing agent and emulsifying agent, as desired.

The core-shell emulsion is a core/shell emulsion wherein the core is copolymer (I) formed from a monomer mixture (1) containing the polymerizable unsaturated monomer (a1) and the polymerizable unsaturated monomer (a2), and the shell is copolymer (II) formed from a monomer mixture (2) containing the vinyl aromatic compound (a3) and the other polymerizable unsaturated monomer (a4). The ratio of copolymer (I) and copolymer (II) in the core-shell emulsion is generally preferred to be in the range of 10/90 to 90/10, especially 30/70 to 85/15 and most especially 40/60 to 80/20, as the solid mass ratio of copolymer (I)/copolymer (II), from the viewpoint of the flip-flop properties and smoothness of the coating film that is to be obtained.

The water-dispersible hydroxyl group-containing acrylic resin (a) thus obtained has a resin acid value in the range of preferably 5 to 90 mgKOH/g, more preferably 8 to 50 mgKOH/g and even more preferably 10 to 35 mgKOH/g, from the viewpoint of the storage properties, and the water resistance of the coating film that is to be obtained. The water-dispersible hydroxyl group-containing acrylic resin (a) has a resin hydroxyl value in the range of preferably 1 to 70 mgKOH/g, more preferably 2 to 50 mgKOH/g and even more preferably 5 to 30 mgKOH/g, from the viewpoint of the water resistance of the coating film that is to be obtained.

The coating film-forming resin other than the water-dispersible hydroxyl group-containing acrylic resin (a) may be a polyester resin, an acrylic resin other than (a), or an alkyd resin, polyurethane resin, silicone resin or epoxy resin. The coating film-forming resin other than the water-dispersible hydroxyl group-containing acrylic resin (a) is preferably one having a functional group such as a hydroxyl group.

The first aqueous base coating material of the invention contains a melamine resin (b) as the curing agent. The melamine resin (b) may be a partially methylolated melamine resin or completely methylolated melamine resin obtained by reacting a melamine component and an aldehyde component. Aldehyde components include formaldehyde, paraformaldehyde, acetaldehyde and benzaldehyde.

Also, the methylol groups in the methylolated melamine resin may be partially or completely etherified with a suitable alcohol. Examples of alcohols to be used for the etherification include methyl alcohol, ethyl alcohol, n-propyl alcohol, i-propyl alcohol, n-butyl alcohol, i-butyl alcohol, 2-ethyl-1-butanol and 2-ethyl-1-hexanol.

The melamine resin (b) includes known melamine resins, but most preferably it is a methyl etherified melamine resin wherein the methylol groups of a partially or totally methylolated melamine resin are partially or totally etherified with methyl alcohol, a butyl etherified melamine resin wherein the methylol groups of a partially or totally methylolated melamine resin are partially or totally etherified with butyl alcohol, or a methyl-butyl mixed etherified melamine resin wherein the methylol groups of a partially or totally methylolated melamine resin are partially or totally etherified with methyl alcohol and butyl alcohol, and more preferably it is a methyl-butyl mixed etherified melamine resin.

From the viewpoint of maintaining transparency of the first base coating film and ensuring adhesiveness between the upper and lower low-brightness intercoating film and the second base coating film, the melamine resin (b) has a weight-average molecular weight in the range of 1,000 to 3,000, preferably in the range of 1,100 to 2,800 and more preferably in the range of 1,200 to 2,500.

A curing agent other than the melamine resin (b) may also be used if necessary in the first aqueous base coating material. Specific compounds include urea resins, polyhydrazide compounds, polysemicarbazide compounds, carbodiimide group-containing compounds, oxazoline group-containing compounds, epoxy compounds and polycarboxylic acids. The curing agent to be used as necessary may be a single type or a combination of two or more types.

The mixing proportion of the water-dispersible hydroxyl group-containing acrylic resin (a) and melamine resin (b) in the first aqueous base coating material is preferably in the following range, based on 100 parts by mass as the total solid content of the water-dispersible hydroxyl group-containing acrylic resin (a) and melamine resin (b).

Water-dispersible hydroxyl group-containing acrylic resin (a): 30 to 95 parts by mass, preferably 35 to 85 parts by mass and more preferably 45 to 75 parts by mass, Melamine resin (b): 5 to 70 parts by mass, preferably 15 to 65 parts by mass and more preferably 25 to 55 parts by mass.

The thermosetting first aqueous base coating material of the invention may be a transparent coating material or a pigmented coating material. When the first aqueous base coating material is a transparent coating material, it may lack a color pigment, and may contain an extender pigment if necessary. Examples of extender pigments include barium sulfate, barium carbonate, calcium carbonate, aluminum silicate, silica, magnesium carbonate, talc and alumina white. When an extender pigment is added, the content is preferably in the range of 0.1 to 40 parts by mass and more preferably in the range of 5 to 30 parts by mass, with respect to 100 parts by mass as the solid resin content in the coating material.

When the thermosetting first aqueous base coating material is a pigmented coating material, it may contain a color pigment. Such color pigments are not particularly restricted, and specifically any one or a combination of more than one may be used, from among titanium oxide pigments, iron oxide pigments, composite metal oxide pigments such as titanium yellow, azo-based pigments, quinacridone-based pigments, diketopyrrolopyrrole-based pigments, perylene-based pigments, perinone-based pigments, benzimidazolone-based pigments, isoindoline-based pigments, isoindolinone-based pigments, metal chelate azo-based pigments, phthalocyanine-based pigments, indanthrone-based pigments, dioxane-based pigments, threne-based pigments and indigo-based pigments and carbon black pigments. When a color pigment is added, the content may be in the range of 0.003 to 20 parts by mass, preferably 0.005 to 10 parts by mass and more preferably 0.007 to 5 parts by mass, with respect to 100 parts by mass as the solid resin content in the coating material.

From the viewpoint of preventing reduction in sheen quality caused by fly-off of dust onto inner platings, the thermosetting first aqueous base coating material is preferably a coating material with low coloring strength.

The thermosetting first aqueous base coating material of the invention may be prepared by dispersing and/or dissolving each of the aforementioned components in water or a medium composed mainly of water (an aqueous medium). From the viewpoint of the flip-flop properties and smoothness of the multilayer coating film to be formed, it is suitable for the first aqueous base coating material to have a coating material solid concentration in the range of 16 to 45 mass %, the coating material solid concentration being more suitably in the range of 21 to 40 mass % and even more suitably in the range of 26 to 35 mass %. The coating material solid concentration is represented as the proportion of the mass of the coating material solid content with respect to the total mass of the coating material.

From the viewpoint of the smoothness of the multilayer coating film that is to be formed, the viscosity of the thermosetting first aqueous base coating material of the invention 90 seconds after coating will generally be in the range of 15,000 to 300,000 mPa·s, preferably in the range of 20,000 to 200,000 and more preferably in the range of 30,000 to 150,000, as measured under conditions with a temperature of 25° C. and a shear rate of 0.1 $sec^{-1}$. The viscosity of the first aqueous base coating material 90 seconds after coating is the viscosity measured by applying the first aqueous base coating material onto a 45 cm length×30 cm width×0.8 mm thick tin plate to a cured film thickness of 11 μm, using a spatula or the like to scrape off a sample of a portion of the coating film 90 seconds after the first aqueous base coating material has been applied onto the tin plate, and using a viscoelasticity meter for measurement at 0.1 $sec^{-1}$ when varying the shear rate from 10,000 $sec^{-1}$ to 0.0001 $sec^{-1}$ at a temperature of 20° C. The viscoelasticity meter used may be a "HAAKE RheoStress RS150" (trade name of HAAKE Co.), for example. The viscosity of the first aqueous base coating material 90 seconds after coating may be adjusted by modifying the content of the thickening agent in the first aqueous base coating material, for example.

According to the invention, the black-white concealing film thickness of the cured coating film of the first aqueous base coating material is suitably 50 μm or greater. If the black-white concealing film thickness of the cured coating film is within this range, then when used for automobile coating, the effect of spray dust of the outer plating base coating material on finishing of the inner plating coating film can be drastically reduced. The first aqueous base coating material of the invention is a coating material with low coloring strength, and since it usually contains no pigment or only a small amount of pigment, it provides the advantage of minimizing reduction in the flip-flop properties of the formed coating film, which is believed to occur due to transformation of the pigment when the coating material is applied after storage with circulation. Throughout the present specification, the "black-white concealing film thickness" is the value determined by attaching concealing ratio test paper having a black-white checkered pattern as specified by JIS K5600-4-1, 4.1.2 onto a steel sheet, and then applying the coating material in a graded manner so that the film thickness changes continuously and drying it to hardness, and finally visually observing the coating surface under diffuse daylight and using an electromagnetic film thickness meter to measure the minimum film thickness at which the black-white boundaries of the checkered pattern on the concealing ratio test paper are no longer visible.

According to the invention, the haze of the cured coating film of the first aqueous base coating material is suitably in the range of 0 to 15%. If the haze of the cured coating film is within this range, sufficient transparency can be ensured for the first base coating film that is formed, and a multilayer coating film having excellent brightness can be formed. The haze, for the purpose of the invention, is the value obtained by coating a sample on a glass plate whose haze has been measured beforehand using a haze meter, to a dry film thickness of 15 μm, and drying at 140° C. for 30 minutes to prepare a test piece, and then measuring the haze of the test piece with the haze meter and subtracting the haze of the glass plate. The haze meter used may be an "NDH2000" by Nippon Denshoku Industries Co., Ltd., for example.

The thermosetting first aqueous base coating material of the invention may be applied using appropriate coating means such as an air sprayer, airless sprayer or electrostatic coater. The film thickness of the first base coating film formed by application of the first aqueous base coating material will generally be in the range of 5 to 18 μm, preferably in the range of 6 to 16 μm and more preferably in the range of 7 to 14 μm, as the film thickness of the cured coating film. If the film thickness is adjusted to within this range, it will be possible to form a multilayer coating film having excellent smoothness and adhesiveness, and a polishing mark-concealing property.

[Second Base Coating Film-Forming Step]

In the second base coating film-forming step, the thermosetting second aqueous base coating material containing a brightness pigment is applied onto the uncured first base coating film obtained by the first base coating film-forming step, to form an uncured second base coating film. The thermosetting second aqueous base coating material is an aqueous coating material, and it is suitable to use an aqueous coating material containing the coating film-forming base resin, the curing agent and the brightness pigment, and an aqueous medium consisting of water and/or a hydrophilic organic solvent. The second aqueous base coating material may be mixed with various additives that may be added as necessary to coating materials, such as viscosity-imparting agents, flow adjusters, light stabilizers, ultraviolet absorbers, color pigments, extender pigments and pigment dispersants.

The base resin and curing agent used may be publicly known compounds that are commonly used in the field, with examples of base resins including acrylic resins, polyester resins and polyurethane resins, and examples of curing agents including amino resins, polyisocyanate compounds and blocked polyisocyanate compounds.

The brightness pigment to be added to the thermosetting second aqueous base coating material is a pigment used to impart a sheen quality or optical coherence to the coating film. Such brightness pigments are not particularly restricted, and various brightness pigments used in the field of coating materials may be used. Specific examples of brightness pigments include aluminum flake pigment, vapor deposition aluminum flake pigment, metal oxide-coated aluminum flake pigment, colored aluminum flake pigment, mica, titanium oxide-coated mica, iron oxide-coated mica, micaceous iron oxide, titanium oxide-coated silica, titanium oxide-coated alumina, iron oxide-coated silica and iron oxide-coated alumina. Aluminum flake pigment and colored aluminum flake pigment are most suitable among these.

The content of the brightness pigment in the thermosetting second aqueous base coating material is in the range of usually 10 to 40 parts by mass, preferably 12 to 35 parts by mass and more preferably 15 to 30 parts by mass, with respect to 100 parts by mass as the solid content of the coating material in the second aqueous base coating material. If it is adjusted to within this range, it will be possible to impart sufficient brightness and a base layer concealing property, without impairing the physical properties of the coating material, the coating manageability or the surface smoothness of the coating film.

The solid concentration of the coating material in the thermosetting second aqueous base coating material will usually be in the range of 5 to 20 mass %, preferably in the range of 7 to 17 mass % and more preferably in the range of 9 to 15 mass %. The coating material solid concentration in the thermosetting second aqueous base coating material is preferably not too low as the base layer concealing property of the second base coating film will be low and the strength of the coating film will also be reduced. The coating material solid concentration is also preferably not too high as it will result in a lower aqueous medium content, and reduced contractive force on the uncured coating film in the direction of the film thickness upon volatilization of the aqueous medium during the preheating step described below, resulting in lower orientation of the brightness pigment.

The thermosetting second aqueous base coating material of the invention may be applied using appropriate coating means such as an air sprayer, airless sprayer or electrostatic coater. The film thickness of the second base coating film formed by application of the second aqueous base coating material will generally be in the range of 2 to 8 μm, preferably in the range of 3 to 7 μm and more preferably in the range of 4 to 6 μm, as the film thickness of the cured coating film. Preferably, the second base coating film is formed so that the proportion of the film thicknesses of the cured first base coating film and second base coating film is in the range of 1.5:1 to 6:1, and especially in the range of 1.5:1 to 4:1. By adjusting the film thicknesses within this range, it is possible to increase the amount of brightness pigment per unit area of the coating film and ensure sufficient reflection intensity, without impairing the orientation of the brightness pigment.

[Preheating Step]

In this step, the first base coating film and second base coating film which are uncured and contain the aqueous medium are preheated, volatilizing the aqueous medium in the coating films in a short period of time to form a first base coating film and second base coating film in an uncured and dried state.

As used herein, "preheating" means treatment in which an object to be coated, with a coating film formed on its surface, is heated for a time and under temperature conditions such that the base resin and curing agent in the coating film do not react or cure, or essentially do not react or cure, thus producing volatilization of the aqueous medium and/or other volatile substances in the coating film. As used herein, "dried state" means a state in which the aqueous medium in the coating film has been volatilized off.

In the method of the invention, the thermosetting first base coating material and second base coating material are coated in order in an uncured state (wet-on-wet coating). Thus, by carrying out preheating before curing of the coating film by baking treatment, it is possible to volatilize the aqueous medium from the first base coating film and second base coating film in a short period of time, forming the first base coating film and second base coating film in the uncured and dried state (the preheated first base coating film and second base coating film). The preheated first base coating film and second base coating film contract to a notable extent in the direction of film thickness, with volatilization of the aqueous medium.

Since the second base coating film prior to preheating is uncured and contains an aqueous medium, the brightness pigment in the coating film is oriented in a relatively free manner. Preheating causes the contractive force produced by contraction of the coating film to act on the brightness pigment, as a driving force for orientation, so that each of the brightness pigments becomes aligned either parallel or essentially parallel to the coating surface of the object to be coated. When the brightness pigment has a scaly or lamellar form, each surface (reflection surface) becomes aligned either parallel or essentially parallel to the coating surface, when the brightness pigment itself is aligned. The increased orientation of the brightness pigment results in greater reflection intensity of incident light from the direction of the surface of the coating article.

In this step, the preheating temperature is usually preferred to be in the range of 60 to 100° C., and especially 65 to 90° C. The preheating time is usually preferred to be 1 to 10 minutes. If preheating is carried out under these conditions, the brightness pigment in the second base coating film will have increased orientation, and as a result the brightness on the surface of the coating article comprising the multilayer coating film can be improved.

[Clear Coating Film-Forming Step]

In this step, a thermosetting clear coating material is coated onto the preheated uncured second base coating film to form an uncured clear coating film.

As used herein, "clear coating material" means a transparent coating material used to protect the first and second base coating films. The thermosetting clear coating material used in this step is a thermosetting coating material commonly used in the field, and it is preferably a coating material containing a base resin and curing agent, and a medium consisting of an organic solvent or the like. The base resin and curing agent referred to here may be publicly known compounds commonly used in the relevant field, examples of base resins including carboxyl group-containing acrylic resins, epoxy group-containing acrylic resins and hydroxyl-containing acrylic resins, and examples of curing agents including melamine resins, urea resins, polyisocyanate compounds and blocked polyisocyanate compounds.

The thermosetting clear coating material to be used in the method of the invention may appropriately contain, in addition to the components mentioned above, also the color pigments and brightness pigments mentioned above, as well as extender pigments, ultraviolet absorbers, light stabilizers, antifoaming agents, thickening agents, rust-preventive agents, surface control agents and dyes, as desired.

By coating a thermosetting clear coating material having the composition described above, it is possible to obtain a clear coating film having a sufficient cured film thickness for protection of the first and second base coating film, and excellent surface smoothness.

The clear coating material of the invention may be applied using an appropriate method such as electrostatic coating, air spraying or airless spraying. The clear coating film formed in this step is generally preferred to have a thickness in the range of 15 to 60 μm and especially 25 to 45 μm, as the film thickness of the cured clear coating film. If the thickness of the clear coating film is adjusted to within this range, it will be possible to form a satisfactory coating film without lowering the surface smoothness.

In the baking step of the method of the invention, described below, the uncured first base coating film, second base coating film and clear coating film are simultaneously subjected to baking treatment to heat and cure the coating films, and form a multilayer coating film that includes the first base coating film, second base coating film and clear coating film in a cured, dried state.

[Baking Step]

In this step, the uncured first base coating film, second base coating film and clear coating film described above are simultaneously subjected to baking treatment to form a multilayer coating film that includes the cured first base coating film, second base coating film and clear coating film. The heating may be carried out by means such as hot air heating, infrared heating or high-frequency heating, with a heating temperature of preferably 80 to 160° C. and more preferably 100 to 140° C. The heating time is preferably 10 to 60 minutes and more preferably 15 to 40 minutes.

When the coating article that has been coated by the method of the invention is a plate or molded article for production of an automobile body and/or related part, the total film thickness of the first base coating film and second base coating film in the cured and dried state formed on the object to be coated is usually preferred to be less than 20 μm.

Carrying out baking treatment under these conditions allows production of a coated article comprising a multilayer coating film with excellent brightness.

[Multilayer Coating Film after Formation]

With the method of forming a multilayer coating film according to the invention, as described above, it is possible to form a high-design multilayer coating film with excellent brightness, while employing wet-on-wet coating using an aqueous coating material with low environmental load and high energy efficiency. In addition, when used for automobile coating, the effect of spray dust of the outer plating base coating material on finishing of the inner plating coating film can be drastically reduced. Furthermore, it is possible to form a multilayer coating film with excellent flip-flop properties and smoothness, by a multilayer coating film structure comprising a specific low-brightness intercoating film, and having a specific first base coating film and second base coating film formed over it.

EXAMPLES

The present invention will now be explained in greater detail using examples and comparative examples. However, the invention is in no way limited by the examples. Throughout the examples, the "parts" and "%" values are based on mass, unless otherwise specified. Also, the film thicknesses of the coating films are based on the cured coating films.

Production of Hydroxyl-Containing Polyester Resin for Intercoat Material (A)

Production Example 1

After placing 664 parts of isophthalic acid, 496 parts of adipic acid, 237 parts of phthalic anhydride, 788 parts of neopentyl glycol and 341 parts of trimethylolpropane in a reactor equipped with a stirrer, thermometer, reaction product water-removing device and nitrogen gas inlet tube, the mixture was heated to 160° C. while stirring under a nitrogen gas atmosphere. After holding the mixture at 160° C. for 1 hour, the temperature was raised to 230° C. over a period of 5 hours while removing the condensation water that was produced, and the mixture was held at the same temperature. When the acid value reached 7 mgKOH/g, the mixture was cooled to 170° C., 490 parts of ε-caprolactone was added and the mixture was held at the same temperature for 1 hour, after which it was diluted with SWASOL 1000 (petroleum-based high-boiling-point aromatic solvent, product of Shell Chemicals, Japan) to a heating residue of 70%, to obtain a hydroxyl-containing polyester resin (PE-1). The hydroxyl value of the obtained hydroxyl-containing polyester resin (PE-1) was 100 mgKOH/g, the acid value was 5.7 mgKOH/g, the number-average molecular weight was 2030 and the heating residue was 70%.

Production of Intercoat Material

Production Examples 2 to 7

After mixing and stirring each of the starting materials of the compositions listed in Table 1 (the acid group-containing polyester resin (PE-1), melamine resin (B-1), pyrazole blocked polyisocyanate compound (C-1) and pigments (D-1)-(D-4), produced in Production Example 1), butyl acetate was added to obtain intercoat material compositions (PR-1)-(PR-6), each having a viscosity of 30 seconds with a Ford cup No. 4 at 20° C. The content of each component listed is the solid content.

TABLE 1

| | Production Example | | | | | |
|---|---|---|---|---|---|---|
| | 2 | 3 | 4 | 5 | 6 | 7 |
| Intercoat coating material | PR-1 | PR-2 | PR-3 | PR-4 | PR-5 | PR-6 |
| Hydroxyl-containing polyester resin (PE-1) | 65 | 65 | 65 | 65 | 65 | 65 |
| Melamine resin (B-1) | 15 | 15 | 15 | 15 | 15 | 15 |
| Block polyisocyanate compound (C-1) | 20 | 20 | 20 | 20 | 20 | 20 |
| Pigment (D-1) | 3.5 | 2.5 | 1.8 | 1.4 | 1.3 | 1.1 |
| Pigment (D-2) | 0 | 3.8 | 6.6 | 8.2 | 14.9 | 28 |
| Pigment (D-3) | 45 | 45 | 56 | 63 | 58 | 47 |
| Pigment (D-4) | 1.6 | 1.6 | 2.7 | 3.4 | 3.6 | 3.9 |
| Intercoating film L* value | 5 | 12 | 18 | 20 | 29 | 35 |

The starting materials used, shown in Table 1, were as follows.

Melamine resin (B-1): weight-average molecular weight: 1200, imino group-containing methyl/butyl mixed etherified melamine.

Blocked polyisocyanate compound (C-1): Hexamethylene diisocyanate full-blocked with 3,5-dimethylpyrazole.

Pigment (D-1): Carbon black pigment, "Carbon MA-100": trade name of Mitsubishi Chemical Corp.

Pigment (D-2): Rutile titanium dioxide pigment, "JR-806": trade name of Tayca Corp.

Pigment (D-3): Barium sulfate pigment, "BARIFINE BF-20": trade name of Sakai Chemical Industry Co., Ltd.

Pigment (D-4): Talc pigment, "MICRO ACE S-3": trade name of Nippon Talc Co., Ltd.

Production of Aqueous Dispersion of Water-Dispersible Hydroxyl Group-Containing Acrylic Resin (a)

Production Example 8

After charging 128 parts of deionized water and 2 parts of "ADEKA REASOAP SR-1025" (trade name of Adeka Corp., emulsifying agent, active ingredient: 25%) into a reactor equipped with a thermometer, thermostat, stirrer, reflux condenser, nitrogen inlet tube and dropper, the mixture was stirred in a nitrogen stream and heated to 80° C.

Next, 1% of the total core section monomer emulsion described below and 5.3 parts of a 6% ammonium persulfate aqueous solution were introduced into the reactor, and the mixture was kept at 80° C. for 15 minutes. The remainder of the core section monomer emulsion was then added dropwise into the reactor kept at the same temperature over a period of 3 hours, and upon completion of the dropwise addition the mixture was aged for 1 hour. Next, the shell section monomer emulsion was added dropwise over a period of 1 hour and aged for 1 hour, and the mixture was then cooled to 30° C. while gradually adding 40 parts of a 5% 2-(dimethylamino)ethanol aqueous solution to the reactor, and subsequently discharged while filtering with a 100 mesh nylon cloth, to obtain a water-dispersible hydroxyl group-containing acrylic resin (a-1) aqueous dispersion with a mean particle diameter of 100 nm and a solid content of 30%. The obtained water-dispersible hydroxyl group-containing acrylic resin (a-1) had an acid value of 33 mgKOH/g and a hydroxyl value of 25 mgKOH/g.

Core section monomer emulsion: 40 parts of deionized water, 2.8 parts of "ADEKA REASOAP SR-1025", 2.1 parts of methylenebisacrylamide, 2.8 parts of styrene, 16.1 parts of methyl methacrylate, 28 parts of ethyl acrylate and 21 parts of n-butyl acrylate were mixed and stirred to obtain a core section monomer emulsion.

Shell section monomer emulsion: 17 parts of deionized water, 1.2 parts of "ADEKA REASOAP SR-1025", 0.03 part of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate and 9 parts of n-butyl acrylate were mixed and stirred to obtain a shell section monomer emulsion.

Production of Coating Film-Forming Resin Other than Water-Dispersible Hydroxyl Group-Containing Acrylic Resin (a)

Production Example 9

After charging 35 parts of propyleneglycol monopropyl ether into a reactor equipped with a thermometer, thermostat, stirrer, reflux condenser, nitrogen inlet tube and dropper, and heating to 85° C., a mixture of 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propyleneglycol monopropyl ether and 2.3 parts of 2,2'-azobis(2,4-dimethylvaleronitrile) was added dropwise over a period of 4 hours, and upon completion of the dropwise addition the mixture was aged for 1 hour. A mixture of 10 parts of propyleneglycol monopropyl ether and 1 part of 2,2'-azobis(2,4-dimethylvaleronitrile) was then further added dropwise over a period of 1 hour, and upon completion of the dropwise addition the mixture was aged for 1 hour. Next, 7.4 parts of diethanolamine was added to obtain a hydroxyl-containing acrylic resin (AC-1) solution with a solid content of 55%. The acid value of the obtained hydroxyl group-containing acrylic resin (AC-1) was 47 mgKOH/g, the hydroxyl value was 72 mgKOH/g, and the weight-average molecular weight was 58,000.

Production Example 10

After placing a mixed solvent of 27.5 parts of methoxypropanol and 27.5 parts of isobutanol in a reactor equipped with a thermometer, thermostat, stirrer, reflux condenser, nitrogen inlet tube and dropper, and heating to 110° C., 121.5 parts of a mixture comprising 25.0 parts of styrene, 27.5 parts of n-butyl methacrylate, 20.0 parts of "Isostearyl acrylate" (trade name of Osaka Organic Chemical Industry, Ltd., branched higher alkyl acrylate), 7.5 parts of 4-hydroxybutyl acrylate, 15.0 parts of a phosphate group-containing polymerizable monomer, 12.5 parts of 2-methacryloyloxyethyl acid phosphate, 10.0 parts of isobutanol and 4.0 parts of t-butyl peroxyoctanoate was added to the mixed solvent over a period of 4 hours, and then a mixture of 0.5 part of t-butyl peroxyoctanoate and 20.0 parts of isopropanol was added dropwise over a period of 1 hour. The mixture was then stirred and aged for 1 hour to obtain an acrylic resin (AC-2) solution with hydroxyl and phosphate groups, having a solid content of 50%. The acrylic resin (AC-2) with hydroxyl and phosphate groups had an acid value of 83 mgKOH/g, a hydroxyl value of 29 mgKOH/g and a weight-average molecular weight of 10,000.

Phosphate group-containing polymerizable monomer: After placing 57.5 parts of monobutylphosphoric acid and 41.0 parts of isobutanol in a reactor equipped with a thermometer, thermostat, stirrer, reflux condenser, nitrogen inlet tube and dropper and heating them to 90° C., 42.5 parts of glycidyl methacrylate was added dropwise over a period of 2 hours, and further stirred and aged for 1 hour. Next, 59.0 parts of isopropanol was added to obtain a phosphate group-containing polymerizable monomer solution with a solid concentration of 50%. The acid value of the obtained monomer was 285 mgKOH/g.

Production Example 11

After charging 109 parts of trimethylolpropane, 141 parts of 1,6-hexanediol, 126 parts of 1,2-cyclohexanedicarboxylic anhydride and 120 parts of adipic acid into a reactor equipped with a thermometer, thermostat, stirrer, reflux condenser and water separator, and heating from 160° C. to 230° C. for a period of 3 hours, condensation reaction was conducted at 230° C. for 4 hours. Next, 38.3 parts of trimellitic anhydride was added to introduce carboxyl groups into the obtained condensation reaction product, and reaction was conducted at 170° C. for 30 minutes, after which dilution was performed with 2-ethyl-1-hexanol to obtain a hydroxyl-group containing polyester resin (PE-2) solution with a solid content of 70%. The obtained hydroxyl group-containing polyester resin (PE-2) had an acid value of 46 mgKOH/g, a hydroxyl value of 150 mgKOH/g and a number-average molecular weight of 1,400.

Production of Color Pigment Dispersion

Production Example 12

After mixing 18 parts of the acrylic resin solution (AC-1) obtained in Production Example 9 (10 parts solid resin content), 10 parts of "Carbon MA-100" (trade name of Mitsubishi Chemical Corp., carbon black pigment) and 60 parts of deionized water, the mixture was adjusted to pH 8.2 with 2-(dimethylamino)ethanol, and then dispersed for 30 minutes with a paint shaker to obtain color pigment dispersion (P-1).

Production of Extender Pigment Dispersion

Production Example 13

After mixing 18 parts of the acrylic resin solution (AC-1) obtained in Production Example 9 (10 parts solid resin content), 25 parts of "BARIFINE BF-20" (trade name of Sakai Chemical Industry Co., Ltd., barium sulfate pigment), 0.6 part of "SURFYNOL 104A" (trade name of Air Products & Chemicals, antifoaming agent, 50% solid content) (0.3 part solid content) and 36 parts of deionized water, the mixture was dispersed for 1 hour with a paint shaker to obtain extender pigment dispersion (P-2).

Production of Brightness Pigment Dispersion

Production Example 14

In a stirring and mixing container, 4 parts of "ALPASTE TCR2060" (trade name of Toyo Aluminium, KK., aluminum pigment paste, aluminum content: 75%) (3 parts solid content), 13.8 parts of "ALPASTE 7640NS" (trade name of Toyo Aluminium, KK., aluminum pigment paste, aluminum content: 65%) (9 parts solid content), 35.0 parts of 2-ethyl-1-hexanol and 7.2 parts of the acrylic resin (AC-2) solution with hydroxyl and phosphate groups obtained in Production Example 3 (3.6 parts solid content) were uniformly mixed to obtain brightness pigment dispersion (P-3).

Production Example 15

In a stirring and mixing container, 6.7 parts of "ALPASTE TCR2060" (trade name of Toyo Aluminium, KK., aluminum pigment paste, aluminum content: 75%) (5 parts solid content), 23.1 parts of "ALPASTE 7640NS" (trade name of Toyo Aluminium, KK., aluminum pigment paste, aluminum content: 65%) (15 parts solid content), 35.0 parts of 2-ethyl-1-hexanol and 12 parts of the acrylic resin (AC-2) solution with hydroxyl and phosphate groups obtained in Production Example 3 (6 parts solid content) were uniformly mixed to obtain brightness pigment dispersion (P-4).

Production Example 16

In a stirring and mixing container, 10.7 parts of "ALPASTE TCR2060" (trade name of Toyo Aluminium, KK., aluminum pigment paste, aluminum content: 75%) (8 parts solid content), 33.8 parts of "ALPASTE 7640NS" (trade name of Toyo Aluminium, KK., aluminum pigment paste, aluminum content: 65%) (22 parts solid content), 35.0 parts of 2-ethyl-1-hexanol and 18 parts of the acrylic resin (AC-2) solution with hydroxyl and phosphate groups obtained in Production Example 3 (9 parts solid content) were uniformly mixed to obtain brightness pigment dispersion (P-5).

Production of Aqueous First Base Coating Material

Production Example 17

After uniformly mixing 116.7 parts of the water-dispersible hydroxyl group-containing acrylic resin (a-1) aqueous dispersion obtained in Production Example 8 (35 parts solid content), 27.3 parts of the hydroxyl group-containing acrylic resin solution (AC-1) obtained in Production Example 9 (15 parts solid content), 28.6 parts of the polyester resin solution (PE-2) obtained in Production Example 11 (20 parts solid content) and 42.9 parts of a melamine resin (b-1) (weight-average molecular weight: 1,200, 70% solid content) (30 parts solid content), “ADEKANOL UH-756VF” (trade name of Adeka Corp., thickening agent), 2-(dimethylamino) ethanol and deionized water were further added to obtain aqueous first base coating material (1-1), having a pH of 8.0, a coating material solid content of 32%, and a viscosity of 50,000 mPa·s 90 seconds after coating, as measured under conditions with a temperature of 25° C. and a shear rate of 0.1 $sec^{-1}$.

Production Examples 18 to 35

Aqueous first base coating materials (1-2) to (1-19) with pH 8.0 were obtained in the same manner as Example 17, except for changing the formulating composition, coating material solid content and viscosity 90 seconds after coating for Production Example 17 as listed in Table 2 below. Also, the black-white concealing film thickness of the cured coating film formed by each aqueous first base coating material, and the haze of the cured coating film with a thickness of 15 μm formed by the aqueous first base coating material, are shown in Table 2-1 and Table 2-2.

TABLE 2-1

| | Production Example | | | | |
|---|---|---|---|---|---|
| | 17 | 18 | 19 | 20 | 21 |
| First aqueous base coating material | 1-1 | 1-2 | 1-3 | 1-4 | 1-5 |
| Water-dispersible hydroxyl group-containing acrylic resin (a-1) | 116.7 | 116.7 | 116.7 | 116.7 | 116.7 |
| Hydroxyl-containing acrylic resin (AC-1) | 27.3 | 27.3 | 27.3 | 27.3 | 27.3 |
| Hydroxyl-containing polyester resin (PE-2) | 28.6 | 28.6 | 28.6 | 28.6 | 28.6 |
| Melamine resin (b-1) | 42.9 | | | | |
| Melamine resin (b-2) (*1) | | 40.0 | | | 40.0 |
| Melamine resin (b-3) (*2) | | | 42.9 | | |
| Melamine resin (b-4) (*3) | | | | 50.0 | |
| Melamine resin (b-5) (*4) | | | | | |
| Melamine resin (b-6) (*5) | | | | | |
| Coloring pigment dispersion (P-1) | | | | | |
| Extender pigment dispersion (P-2) | | | | | |
| Brightness pigment dispersion (P-3) | | | | | |
| Coating material solid content [%] | 32 | 32 | 32 | 32 | 32 |
| Viscosity (25° C., 0.1 $sec^{-1}$) 90 seconds after coating [mPa · s] | 50,000 | 50,000 | 50,000 | 50,000 | 25,000 |
| Black-white concealing film thickness [μm] | 100< | 100< | 100< | 100< | 100< |
| Haze of 15 μm-thick cured coating film [%] | 3 | 2 | 5 | 6 | 3 |

| | Production Example | | | |
|---|---|---|---|---|
| | 22 | 23 | 24 | 25 |
| First aqueous base coating material | 1-6 | 1-7 | 1-8 | 1-9 |
| Water-dispersible hydroxyl group-containing acrylic resin (a-1) | 116.7 | 116.7 | 116.7 | 116.7 |
| Hydroxyl-containing acrylic resin (AC-1) | 27.3 | 27.3 | 27.3 | 27.3 |
| Hydroxyl-containing polyester resin (PE-2) | 28.6 | 28.6 | 28.6 | 28.6 |
| Melamine resin (b-1) | | | | |
| Melamine resin (b-2) (*1) | 40.0 | 40.0 | 40.0 | 40.0 |
| Melamine resin (b-3) (*2) | | | | |
| Melamine resin (b-4) (*3) | | | | |
| Melamine resin (b-5) (*4) | | | | |
| Melamine resin (b-6) (*5) | | | | |
| Coloring pigment dispersion (P-1) | | | | |
| Extender pigment dispersion (P-2) | | | | |
| Brightness pigment dispersion (P-3) | | | | |
| Coating material solid content [%] | 32 | 32 | 32 | 32 |
| Viscosity (25° C., 0.1 $sec^{-1}$) 90 seconds after coating [mPa · s] | 35,000 | 100,000 | 130,000 | 210,000 |
| Black-white concealing film thickness [μm] | 100< | 100< | 100< | 100< |
| Haze of 15 μm-thick cured coating film [%] | 3 | 3 | 3 | 3 |

TABLE 2-2

| | Production Example | | | | | |
|---|---|---|---|---|---|---|
| | 26 | 27 | 28 | 29 | 30 | 31 |
| First aqueous base coating material | 1-10 | 1-11 | 1-12 | 1-13 | 1-14 | 1-15 |
| Water-dispersible hydroxyl group-containing acrylic resin (a-1) | 116.7 | 116.7 | 116.7 | 116.7 | 116.7 | 116.7 |
| Hydroxyl-containing acrylic resin (AC-1) | 27.3 | 12.7 | 27.3 | 27.3 | 20.7 | 20.9 |
| Hydroxyl-containing polyester resin (PE-2) | 28.6 | 28.6 | 28.6 | 28.6 | 28.6 | 28.6 |
| Melamine resin (b-1) | | | | | | |
| Melamine resin (b-2) (*1) | 40.0 | 40.0 | 40.0 | 40.0 | 40.0 | 40.0 |
| Melamine resin (b-3) (*2) | | | | | | |
| Melamine resin (b-4) (*3) | | | | | | |
| Melamine resin (b-5) (*4) | | | | | | |
| Melamine resin (b-6) (*5) | | | | | | |
| Coloring pigment dispersion (P-1) | 0.98 | | | | | 34.4 |
| Extender pigment dispersion (P-2) | | 63.8 | | | | |
| Brightness pigment dispersion (P-3) | | | | | 60.0 | |
| Coating material solid content [%] | 32 | 32 | 28 | 35 | 32 | 32 |
| Viscosity (25° C., 0.1 sec$^{-1}$) 90 seconds after coating [mPa · s] | 50,000 | 50,000 | 50,000 | 50,000 | 50,000 | 50,000 |
| Black-white concealing film thickness [μm] | 100< | 100< | 100< | 100< | 15 | 13 |
| Haze of 15 μm-thick cured coating film [%] | 13 | 8 | 3 | 3 | 30< | 30< |

| | Production Example | | | |
|---|---|---|---|---|
| | 32 | 33 | 34 | 35 |
| First aqueous base coating material | 1-16 | 1-17 | 1-18 | 1-19 |
| Water-dispersible hydroxyl group-containing acrylic resin (a-1) | 116.7 | 116.7 | 116.7 | 116.7 |
| Hydroxyl-containing acrylic resin (AC-1) | 27.3 | 27.3 | 27.3 | 27.3 |
| Hydroxyl-containing polyester resin (PE-2) | 28.6 | 28.6 | 28.6 | 28.6 |
| Melamine resin (b-1) | | | | |
| Melamine resin (b-2) (*1) | 40.0 | 40.0 | | |
| Melamine resin (b-3) (*2) | | | | |
| Melamine resin (b-4) (*3) | | | | |
| Melamine resin (b-5) (*4) | | | 37.5 | |
| Melamine resin (b-6) (*5) | | | | 54.5 |
| Coloring pigment dispersion (P-1) | | | | |
| Extender pigment dispersion (P-2) | | | | |
| Brightness pigment dispersion (P-3) | | | | |
| Coating material solid content [%] | 32 | 32 | 32 | 32 |
| Viscosity (25° C., 0.1 sec$^{-1}$) 90 seconds after coating [mPa · s] | 13,000 | 320,000 | 50,000 | 50,000 |
| Black-white concealing film thickness [μm] | 100< | 100< | 100< | 100< |
| Haze of 15 μm-thick cured coating film [%] | 3 | 3 | 2 | 7 |

(*1) Melamine resin (b-2) (weight-average molecular weight: 2,000, solid content: 75%)

(*2) Melamine resin (b-3) (weight-average molecular weight: 2,500, solid content: 70%)

(*3) Melamine resin (b-4) (weight-average molecular weight: 800, solid content: 80%)

(*4) Melamine resin (b-5) (weight-average molecular weight: 3,000, solid content: 60%)

(*5) Melamine resin (b-6) (weight-average molecular weight: 4,000, solid content: 55%)

Preparation of Aqueous Second Base Coating Material

Production Example 36

After uniformly mixing 100 parts of the water-dispersible hydroxyl group-containing acrylic resin (a-1) aqueous dispersion obtained in Production Example 8 (30 parts solid content), 36.4 parts of the hydroxyl group-containing acrylic resin solution (AC-1) obtained in Production Example 9 (20 parts solid content), 28.6 parts of the polyester resin solution (PE-2) obtained in Production Example 11 (20 parts solid content), 42.9 parts of melamine resin (b-1) (weight-average molecular weight: 1,200, solid content: 70%) (30 parts solid content) and 76.7 parts of the brightness pigment dispersion (P-4) obtained in Production Example 15, "PRIMAL ASE-60" (trade name of The Dow Chemical Company, polyacrylic acid-based thickening agent), 2-(dimethylamino) ethanol and deionized water were further added, to obtain aqueous second base coating material (2-1) having a pH of 8.0, a coating material solid content of 12%, and a viscosity of 40 seconds using a Ford cup No. 4 at 20° C. The scaly brightness pigment content in the aqueous second base coating material (2-1) was 16.7 parts by mass with respect to 100 parts by mass as the coating material solid content of the aqueous second base coating material (2-1).

Production Examples 37 to 40

Aqueous second base coating materials (2-2) to (2-5) with pH 8.0 and viscosity of 40 seconds using a Ford cup No. 4 at 20° C., were obtained in the same manner as Example 36, except for changing the formulating composition and coating material solid content for Production Example 36 as listed in Table 3 below. The scaly brightness pigment content of each aqueous second base coating material is also listed in Table 3, as the parts by mass of the scaly brightness pigment with respect to 100 parts by mass of the coating material solid content of the second base coating material.

TABLE 3

| | Production Example | | | | |
|---|---|---|---|---|---|
| | 36 | 37 | 38 | 39 | 40 |
| First aqueous base coating material | 2-1 | 2-2 | 2-3 | 2-4 | 2-5 |
| Water-dispersible hydroxyl group-containing acrylic resin (a-1) | 100 | 100 | 100 | 100 | 100 |
| Hydroxyl-containing acrylic resin (AC-1) | 36.4 | 36.4 | 36.4 | 36.4 | 36.4 |
| Hydroxyl-containing polyester resin (PE-2) | 28.6 | 28.6 | 28.6 | 28.6 | 28.6 |
| Melamine resin (b-1) | 42.9 | 42.9 | 42.9 | 42.9 | 42.9 |
| Brightness pigment dispersion (P-3) | | | | | 60.0 |
| Brightness pigment dispersion (P-4) | 76.7 | 76.7 | 76.7 | | |
| Brightness pigment dispersion (P-5) | | | | 97.5 | |
| Coating material solid content [%] | 12 | 14 | 9 | 12 | 25 |
| Content of brightness pigment with respect to 100 parts by mass coating material solid content [parts by mass] | 16.7 | 16.7 | 16.7 | 23.1 | 10.7 |

Fabrication of Test Object to be Coated

A zinc phosphate-treated cold-rolled steel sheet was electrodeposited with a thermosetting epoxy resin-based cation electrodeposition coating composition (trade name "ELECRON GT-10" by Kansai Paint Co., Ltd.) to a film thickness of 20 μm, and heated at 170° C. for 30 minutes for curing to produce a test object to be coated.

Example 1

(Fabrication of Test Coating Plate A)

The test object to be coated was electrostatically coated with the intercoat material (PR-1) obtained in Production Example 2 using a rotary atomizing electrostatic coater to a cured film thickness of 35 μm, forming an intercoating film, and after allowing it to stand for 7 minutes, it was heated at 140° C. for 30 minutes to cure the intercoating film. The L* value of the intercoating film was then measured. Specifically, a "CM-512 m3" multi-angle spectrophotometer (product of Konica Minolta Holdings, Inc.) was used to irradiate the coated film surface with light from an angle of 45° with respect to the perpendicular axis, and the L* value of the reflected light in the direction perpendicular to the coated film surface was measured.

A portion of the intercoating film was then marked with a polishing mark using #1000 abrasive paper.

The intercoating film was then electrostatically coated with the first aqueous base coating material (1-2) obtained in Production Example 18, using a rotary atomizing electrostatic coater, to a cured film thickness of 11 μm to form an uncured first base coating film, which was allowed to stand for 1 minute. Next, the uncured first base coating film was electrostatically coated with the second aqueous base coating material (2-1) obtained in Production Example 36, using a rotary atomizing electrostatic coater, to a cured film thickness of 4 μm to form an uncured second base coating film, which was allowed to stand for 3 minutes. After preheating at 80° C. for 3 minutes, the uncured second base coating film was electrostatically coated with a thermosetting acrylic resin-based organic solvent-type clear coating material (trade name: "MAGICRON KINO-1210TW" by Kansai Paint Co., Ltd.), using a rotary atomizing electrostatic coater, to a cured film thickness of 35 μm to form a clear coating film. After standing for 7 minutes, it was heated at 140° C. for 30 minutes to cure the uncured first base coating film, uncured second base coating film and clear coating film to fabricate test coating plate A.

(Fabrication of Test Coating Plate B)

The test object to be coated was electrostatically coated with the intercoat material (PR-1) obtained in Production Example 2 using a rotary atomizing electrostatic coater to a cured film thickness of 35 μm, forming an intercoating film, and after allowing it to stand for 7 minutes, it was heated at 140° C. for 30 minutes to cure the intercoating film.

Half (section I) of the intercoating film surface was then electrostatically coated with the second aqueous base coating material (2-1) obtained in Production Example 36, using a rotary atomizing electrostatic coater, to a cured film thickness of 4 μm to form a film corresponding to an inner plating base coating film, which was allowed to stand for 2 minutes. The other half (section II) of the intercoating film surface of the test object to be coated, on which the inner plating base coating film was not formed, was then electrostatically coated with the first aqueous base coating material (1-2) obtained in Production Example 18, using a rotary atomizing bell coating machine ("ABB Cartridge Bell Paint System", trade name of ABB Co.) to a cured film thickness of 11 μm to form a first base coating film, which was allowed to stand for 1 minute. Next, the first base coating film was coated with the second aqueous base coating material (2-1) obtained in Production Example 36, to a cured film thickness of 4 μm to form a second base coating film, which was allowed to stand for 3 minutes. After preheating at 80° C. for 3 minutes, the uncured second base coating film was electrostatically coated with a thermosetting acrylic resin-based organic solvent-type overcoat clear coating material (trade name: "MAGICRON KINO-1210TW" by Kansai Paint Co., Ltd.), using a rotary atomizing electrostatic coater, to a cured film thickness of 35 μm to form a clear coating film. After standing for 7 minutes, it was heated at 140° C. for 30 minutes to cure the uncured first base coating film, uncured second base coating film and clear coating film to fabricate test coating plate B.

Examples 2 to 18 and Comparative Examples 1 to 9

Test sheet A and test sheet B were fabricated in the same manner as Example 1, except that the type of intercoat material (PR-1), first base coating material (1-1) and second base coating material (2-1) and the cured film thickness in Example 1 were as shown in Table 4-1 and Table 4-2 below.

Evaluation Test

Each test sheet A and test sheet B obtained in Examples 1 to 18 and Comparative Examples 1 to 9 were evaluated by the following test methods. The evaluation results are shown in Table 4-1 and Table 4-2.

(Test Methods)

Design property (FF value): The L* value with an acceptance angle of 15° (L*15 value) and the L* value with an acceptance angle of 75° (L*75 value), for the portion of test sheet A without the polishing mark, were measured using a multi-angle spectrophotometer (trade name: "MA-68II" by x-Rite Co.), and the FF value of the coating film was calculated by the following formula and evaluated on the following scale. A, B and C are acceptable levels.

FF=L*15/L*75

A: FF value of 6.0 or greater.

B: FF value of 5.0 or greater and less than 6.0.

C: FF value of 4.0 or greater and less than 5.0.

D: FF value of 3.0 or greater and less than 4.0.

E: FF value of less than 3.0.

Specifically, the L* value with an acceptance angle of 15° (L*15 value) is the L* value for light received at an angle of 15° in the direction of measuring light from the specular reflection angle, when measuring light has been irradiated from an angle of 45° with respect to the axis perpendicular to the measuring surface, and the L* value with an acceptance angle of 75° (L*75 value) is the L* value for light received at an angle of 75° in the direction of measuring light from the specular reflection angle, when measuring light has been irradiated in the same manner.

Finishing of inner plating coating film surface: The outer appearance of section I of test sheet B was visually evaluated.

G: Adhesion of spray dust observed, but virtually invisible to the eye, with no streaking or other noticeable abnormalities.

F: Adhesion of spray dust visible to the eye, with some streaking or other noticeable abnormalities.

P: Adhesion of spray dust visible to the eye, with clear streaking or other noticeable abnormalities.

Smoothness: For the portion of test sheet A without the polishing mark, evaluation was conducted using the Wd value measured with a Wave Scan DOI (trade name of BYK Gardner). The Wd value is an index of the amplitude of surface roughness with a wavelength of about 3 to 10 mm, with a smaller measured value representing higher smoothness of the coating surface.

A: Wd value of ≤5.

B: Wd value of >5 and ≤10.

C: Wd value of >10 and ≤15.

D: Wd value of >15 and ≤30.

E: Wd value of >30.

Adhesiveness Test: Sheet A was immersed for 240 hours in warm water at 40° C. and then raised and dried at 20° C. for 12 hours, after which the multilayer coating film on the portion without the polishing mark was notched with a cutter in a lattice-like manner reaching to the basis material, to create 100 square grids with sizes of 2 mm×2 mm. Next, adhesive cellophane tape was attached to the surface and the tape was abruptly peeled off at 20° C., after which the residual state of the square grid coating film was examined, and the adhesiveness was evaluated on the following scale.

VG: 100 of the square grid coating films remained, with no minute edge chipping of the coating films at the edges of the cutter notches.

G: 100 of the square grid coating films remained, but minute edge chipping of the coating films occurred at the edges of the cutter notches.

F: 90-99 of the square grid coating films remained.

P: 89 or fewer of the square grids of the coating film remained.

Polishing mark-concealing property: The portion of test sheet A with and the portion without the polishing mark were visually observed and assessed on the following scale.

G: No polishing mark observed.

P: Polishing mark observed.

TABLE 4-1

| | | | | Section I | | Section II | | | | | |
|---|---|---|---|---|---|---|---|---|---|---|---|
| | | | | Second aqueous base coating material | | First aqueous base coating material | | | | | |
| | | Intercoat coating material | | | Curing | | Viscosity (25° C., 0.1 sec$^{-1}$) | Black-white concealing | Haze of 15 μm-thick | Curing | Second aqueous base coating |
| | | Coating material | Coating film L value | Coating material | film thickness [μm] | Coating material | 90 seconds after coating [mPa · s] | film thickness [μm] | cured coating film | film thickness [μm] | material Coating material |
| Example | 1 | PR-1 | 5 | 2-1 | 4 | 1-2 | 50,000 | 100< | 3 | 11 | 2-1 |
| | 2 | PR-2 | 12 | 2-1 | 4 | 1-2 | 50,000 | 100< | 3 | 11 | 2-1 |
| | 3 | PR-3 | 18 | 2-1 | 4 | 1-2 | 50,000 | 100< | 3 | 11 | 2-1 |
| | 4 | PR-4 | 20 | 2-1 | 4 | 1-2 | 50,000 | 100< | 3 | 11 | 2-1 |
| | 5 | PR-5 | 29 | 2-1 | 4 | 1-2 | 50,000 | 100< | 3 | 11 | 2-1 |
| | 6 | PR-4 | 20 | 2-1 | 4 | 1-1 | 50,000 | 100< | 2 | 11 | 2-1 |
| | 7 | PR-4 | 20 | 2-1 | 4 | 1-3 | 50,000 | 100< | 5 | 11 | 2-1 |
| | 8 | PR-4 | 20 | 2-1 | 4 | 1-4 | 50,000 | 100< | 6 | 11 | 2-1 |
| | 9 | PR-4 | 20 | 2-1 | 4 | 1-5 | 25,000 | 100< | 3 | 11 | 2-1 |
| | 10 | PR-4 | 20 | 2-1 | 4 | 1-6 | 35,000 | 100< | 3 | 11 | 2-1 |
| | 11 | PR-4 | 20 | 2-1 | 4 | 1-7 | 100,000 | 100< | 3 | 11 | 2-1 |
| | 12 | PR-4 | 20 | 2-1 | 4 | 1-8 | 130,000 | 100< | 3 | 11 | 2-1 |
| | 13 | PR-4 | 20 | 2-1 | 4 | 1-9 | 210,000 | 100< | 3 | 11 | 2-1 |
| | 14 | PR-4 | 20 | 2-1 | 4 | 1-10 | 50,000 | 100< | 13 | 11 | 2-1 |
| | 15 | PR-4 | 20 | 2-1 | 4 | 1-11 | 50,000 | 100< | 8 | 11 | 2-1 |
| | 16 | PR-4 | 20 | 2-2 | 5 | 1-12 | 50,000 | 100< | 3 | 10 | 2-2 |
| | 17 | PR-4 | 20 | 2-3 | 3 | 1-13 | 50,000 | 100< | 3 | 12 | 2-3 |
| | 18 | PR-4 | 20 | 2-4 | 4 | 1-1 | 50,000 | 100< | 3 | 11 | 2-4 |

TABLE 4-1-continued

| | | Section II Second aqueous base coating material: Coating material solid content [%] | Section II Second aqueous base coating material: Content of brightness pigment with respect to 100 parts by mass coating material solid content [parts by mass] | Section II Second aqueous base coating material: Curing film thickness [μm] | Film thickness ratio between first base coating film and second base coating film | Evaluation: Design property (FF value) | Evaluation: Finishing of inner plating coating film | Evaluation: Smooth-ness | Evaluation: Adhesive-ness | Evaluation: Polishing mark-concealing property |
|---|---|---|---|---|---|---|---|---|---|---|
| Exam-ple | 1 | 12 | 17 | 4 | 2.8/1 | 6.2 | G | A | VG | G |
| | 2 | 12 | 17 | 4 | 2.8/1 | 5.8 | G | A | VG | G |
| | 3 | 12 | 17 | 4 | 2.8/1 | 5.5 | G | A | VG | G |
| | 4 | 12 | 17 | 4 | 2.8/1 | 4.8 | G | A | VG | G |
| | 5 | 12 | 17 | 4 | 2.8/1 | 4.0 | G | A | VG | G |
| | 6 | 12 | 17 | 4 | 2.8/1 | 5.0 | G | A | G | G |
| | 7 | 12 | 17 | 4 | 2.8/1 | 4.6 | G | A | VG | G |
| | 8 | 12 | 17 | 4 | 2.8/1 | 4.5 | G | A | VG | G |
| | 9 | 12 | 17 | 4 | 2.8/1 | 4.8 | G | A | VG | G |
| | 10 | 12 | 17 | 4 | 2.8/1 | 4.8 | G | A | VG | G |
| | 11 | 12 | 17 | 4 | 2.8/1 | 4.8 | G | B | VG | G |
| | 12 | 12 | 17 | 4 | 2.8/1 | 4.8 | G | C | VG | G |
| | 13 | 12 | 17 | 4 | 2.8/1 | 4.8 | G | C | VG | G |
| | 14 | 12 | 17 | 4 | 2.8/1 | 4.8 | G | A | VG | G |
| | 15 | 12 | 17 | 4 | 2.8/1 | 4.5 | G | A | VG | G |
| | 16 | 14 | 17 | 5 | 2/1 | 4.3 | G | A | VG | G |
| | 17 | 9 | 17 | 3 | 4/1 | 6.2 | G | A | VG | G |
| | 18 | 12 | 23 | 4 | 2.8/1 | 4.8 | G | B | G | G |

TABLE 4-2

| | | Intercoat coating material: Coating material | Intercoat coating material: Coating film L value | Section I Second aqueous base coating material: Coating material | Section I Second aqueous base coating material: Curing film thickness [μm] | Section II First aqueous base coating material: Coating material | Section II First aqueous base coating material: Viscosity (25° C., 0.1 $sec^{-1}$) 90 seconds after coating [mPa · s] | Section II First aqueous base coating material: Black-white concealing film thickness [μm] | Section II First aqueous base coating material: Haze of 15 μm-thick cured coating film | Section II First aqueous base coating material: Curing film thickness [μm] | Section II Second aqueous base coating material Coating material |
|---|---|---|---|---|---|---|---|---|---|---|---|
| Comp. Exam-ple | 1 | PR-6 | 35 | 2-1 | 4 | 1-1 | 50,000 | 100< | 3 | 11 | 2-1 |
| | 2 | PR-4 | 20 | 2-1 | 4 | 1-14 | 50,000 | 15 | 30< | 11 | 2-1 |
| | 3 | PR-4 | 20 | 2-1 | 4 | 1-15 | 50,000 | 13 | 30< | 11 | 2-1 |
| | 4 | PR-4 | 20 | 2-1 | 4 | | | — | | | 2-1 |
| | 5 | PR-4 | 20 | 2-1 | 4 | 1-16 | 13,000 | 100< | 3 | 11 | 2-1 |
| | 6 | PR-4 | 20 | 2-1 | 4 | 1-17 | 320,000 | 100< | 3 | 11 | 2-1 |
| | 7 | PR-4 | 20 | 2-1 | 4 | 1-18 | 50,000 | 100< | 2 | 11 | 2-1 |
| | 8 | PR-4 | 20 | 2-1 | 4 | 1-19 | 50,000 | 100< | 7 | 11 | 2-1 |
| | 9 | PR-4 | 20 | 2-5 | 7.5 | 1-1 | 50,000 | 100< | 3 | 7.5 | 2-5 |

| | | Section II Second aqueous base coating material: Coating material solid content [%] | Section II Second aqueous base coating material: Content of brightness pigment with respect to 100 parts by mass coating material solid content [parts by mass] | Section II Second aqueous base coating material: Curing film thickness [μm] | Film thickness ratio between first base coating film and second base coating film | Evaluation: Design property (FF value) | Evaluation: Finishing of inner plating coating film | Evaluation: Smooth-ness | Evaluation: Adhesive-ness | Evaluation: Polishing mark-concealing property |
|---|---|---|---|---|---|---|---|---|---|---|
| Comp. Exam-ple | 1 | 12 | 17 | 4 | 2.8/1 | 3.5 | G | A | VG | G |
| | 2 | 12 | 17 | 4 | 2.8/1 | 4.2 | F | B | VG | G |
| | 3 | 12 | 17 | 4 | 2.8/1 | 6.2 | P | A | VG | G |
| | 4 | 12 | 17 | 4 | | 4.8 | G | A | P | P |
| | 5 | 12 | 17 | 4 | 2.8/1 | 4.8 | G | D | VG | G |
| | 6 | 12 | 17 | 4 | 2.8/1 | 4.8 | G | D | VG | G |

TABLE 4-2-continued

| | | | | | | | | | |
|---|---|---|---|---|---|---|---|---|---|
| 7 | 12 | 17 | 4 | 2.8/1 | 5.2 | G | A | F | G |
| 8 | 12 | 17 | 4 | 2.8/1 | 4.4 | G | D | VG | G |
| 9 | 25 | 11 | 7.5 | 1/1 | 3.2 | G | C | VG | G |

The invention claimed is:

1. A method of forming a multilayer coating film comprising a low-brightness intercoating film formed on an object to be coated, a first base coating film formed on the low-brightness intercoating film, a second base coating film formed on the first base coating film and a clear coating film formed on the second base coating film, the method including:

(1) a first base coating film-forming step in which a thermosetting first aqueous base coating material is coated onto the low-brightness intercoating film to form an uncured first base coating film;

(2) a second base coating film-forming step in which a thermosetting second aqueous base coating material containing a brightness pigment is coated onto the uncured first base coating film to form an uncured second base coating film;

(3) a preheating step in which the uncured first base coating film and second base coating film are preheated;

(4) a clear coating film-forming step in which a thermosetting clear coating material is coated onto the preheated second base coating film to form an uncured clear coating film; and (5) a baking step in which the multilayer coating film comprising the preheated first base coating film and second base coating film and the uncured clear coating film is subjected to heat curing to form a cured multilayer coating film, wherein:

(a) the L* value of the low-brightness intercoating film is 30 or smaller, (b) the first aqueous base coating material has a coating material solid concentration in the range of 16 to 45 mass %, with respect to the total mass of the first aqueous base coating material, and contains a water-dispersible hydroxyl group-containing acrylic resin (a) and a melamine resin (b), the water-dispersible hydroxyl group-containing acrylic resin (a) having a core/shell-type multilayer structure composed of a core of a copolymer (I) obtained by copolymerizing 0.1 to 30 mass % of a polymerizable unsaturated monomer with two or more polymerizable unsaturated groups in a monomer (a1) and 70 to 99.9 mass % of another polymerizable unsaturated monomer (a2), the mass % of the polymerizable unsaturated monomer (a1) and the polymerizable unsaturated monomer (a2) each being based on the total mass of the monomer (a1) and the monomer (a2) combined, and a shell of a copolymer (II) obtained by copolymerizing 5 to 50 mass % of a vinyl aromatic compound (a3) and 50 to 95 mass % of another polymerizable unsaturated monomer (a4), the mass % of the compound (a3) and the monomer (a4) each being based on the total mass of the compound (a3) and the monomer (a4) combined, and the copolymer (I)/copolymer (II) solid mass ratio being in the range of 10/90 to 90/10, and the weight-average molecular weight of the melamine resin (b) being in the range of 1,000 to 3,000, (c) the viscosity of the first aqueous base coating material at 90 seconds after coating is in the range of 15,000 to 300,000 mPa·s as measured under conditions with a temperature of 25° C. and a shear rate of 0.1 $sec^{-1}$, (d) the black-white concealing film thickness of the cured coating film of the first aqueous base coating material is 50 μm or greater, and the haze of the cured coating film with a film thickness of 15 μm is in the range of 0 to 15%, (e) the second aqueous base coating material has a coating material solid concentration in the range of 5 to 15 mass % with respect to the total mass of the second aqueous base coating material, and contains a brightness pigment in the range of 10 to 40 parts by mass with respect to 100 parts by mass as the solid content of the second aqueous base coating material, (f) the film thickness of the cured second base coating film is in the range of 2 to 8 μm, and (g) the ratio between the film thicknesses of the cured first base coating film and second base coating film is in the range of 1.5:1 to 6:1.

2. The method of forming a multilayer coating film according to claim 1, wherein the first aqueous base coating material does not contain a brightness pigment.

* * * * *